United States Patent [19]

Matsuda

[11] Patent Number: 4,561,020
[45] Date of Patent: Dec. 24, 1985

[54] STILL PICTURE TRANSMISSION APPARATUS

[75] Inventor: Akio Matsuda, Tokyo, Japan

[73] Assignee: NEC Corporation, Tokyo, Japan

[21] Appl. No.: 501,355

[22] Filed: Jun. 6, 1983

[30] Foreign Application Priority Data

Jun. 4, 1982 [JP] Japan .................................. 57-95930

[51] Int. Cl.⁴ .......................... H04N 7/18; H04N 7/12
[52] U.S. Cl. ..................................... 358/134; 358/146; 358/183
[58] Field of Search ................. 358/22, 134, 148, 181, 358/183, 288, 85, 86, 142, 146, 147; 179/2 TV, 1 CN

[56] References Cited

U.S. PATENT DOCUMENTS

| | | | |
|---|---|---|---|
| 4,095,248 | 6/1978 | Kolker | 358/288 |
| 4,231,063 | 10/1980 | Ito | 358/148 |
| 4,266,242 | 5/1981 | McCoy | 358/22 |
| 4,467,355 | 8/1984 | Matsuda | 358/134 |

Primary Examiner—Howard W. Britton
Attorney, Agent, or Firm—Sughrue, Mion, Zinn, Macpeak & Seas

[57] ABSTRACT

A still picture transmission apparatus operable in the quad-split mode, includes a switcher device for receiving a plurality of video signals and for transmitting the received video signals one at a time in a sequential manner. The switcher transmitted video signals are compressed and stored at defined locations of a suitable memory for subsequent transmission over a transmission line. To increase efficiency, each sequentially selected video signal is investigated to determine if it contains video information. If it is found that no video information is present, the switcher is directed to immediately select the next video signal and not wait out the time period normally allowed for the compression, storage and transmission of video information. The video signals are investigated by detecting the presence or absence of a television synchronizing signal in each of the video signals.

9 Claims, 4 Drawing Figures

STILL PICTURE TRANSMISSION APPARATUS

BACKGROUND OF THE INVENTION

The present invention relates to a still picture transmission apparatus and, more particularly, to a quad-split still picture transmission apparatus in which four video pictures are compressed and transmitted.

Generally, a still picture is transmitted through a narrow band telephone transmission line so that a time period of about 42 seconds is required for transmitting a whole picture. When four different video pictures are serially transmitted, the rather long period of about 168 seconds is required for renewing the transmission corresponding to one video picture. In order to reduce the renewing period to one video picture, a quad-split still picture transmission apparatus for transmitting four compressed video pictures had been proposed in the U.S. Pat. No. 4,467,355 by the same applicant. This proposed apparatus has the advantage that the time period required for renewing each compressed video picture can be reduced to a fourth, i.e., about 10 seconds, and that four different video pictures can be monitored simultaneously.

In the proposed apparatus described above, four input terminals corresponding to four input video signals are automatically and serially switched for transmission irrespective of whether the input video signal is actually supplied or not. In other words, even if one of four input video signals is not supplied, or even if the input video signal is suddenly cut off, the transmission operation continues while there is no video information to be transmitted. Therefore, the time period of the transmission corresponding to no video information is wasted.

SUMMARY OF THE INVENTION

Therefore, it is an object of the present invention to provide a quad-split still picture transmission apparatus capable of causing continued transmission of video signals even when video information is not supplied.

According to the present invention, there is provided a still picture transmission apparatus, which comprises selecting means responsive to four input video signals for selecting sequentially one of them, an A/D converter for converting the selected video signals delivered from the selecting means into digital video data, memory means, address producing means for producing write-in addresses so as to write the digital video data at predetermined areas of the memory means while compressing the video data and for producing read-out addresses at a speed corresponding to a frequency bandwidth of a transmission line so as to readout the compressed video data, means for modulating the compressed data read out from the memory means for transmission, means for detecting the presence or absence of a television synchronizing signal in the selected video signal from the selecting means, and means responsive to the detection of the absence of a television synchronizing signal for advancing the selecting means to select the next video signal and the address producing means to cause it to produce the memory address corresponding to the next video signal.

PREFERRED EMBODIMENT OF THE INVENTION

Figure 1:
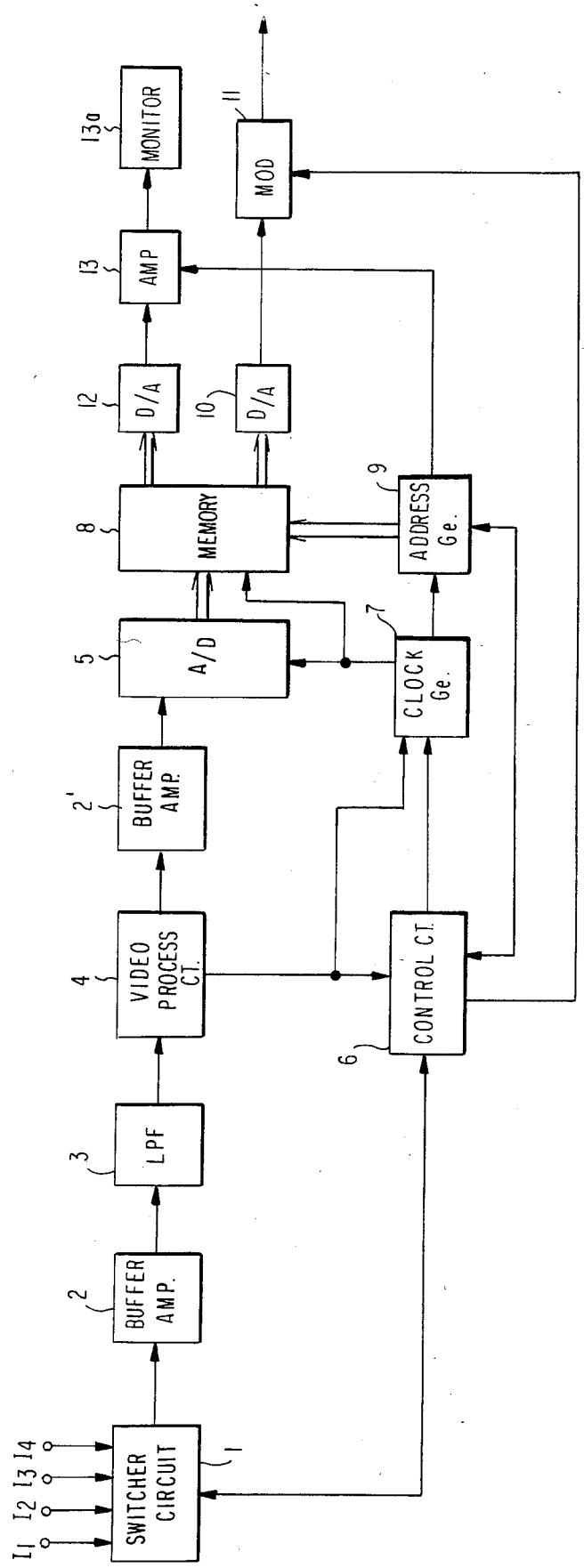
FIG. 1 is a block diagram of a still picture transmission apparatus according to an embodiment of the present invention.

In FIG. 1, one video signal is selected by a switching part 1 receiving four video signals $I_1$ to $I_4$. The selected video input is sent via a buffer amplifier 2 and a low-pass filter 3 to a video processing circuit 4 containing a clamper, a gain controller and a synchronizing signal separation circuit. The video signal delivered from the video processing circuit 4 is sent to an A/D converter 5 via a buffer amplifier 2'. At the same time, a synchronizing signal separated by the video processing circuit 4 is supplied to a control part 6 and a clock generating circuit 7. In order that this apparatus can be operated even if the input video signals are asynchronous with each other, the clock generating circuit 7 contains a phase-locked loop clock generating circuit generating a clock synchronized with the video signal selected by the switching part 1, and a reference clock generating circuit generating a clock for a low-speed read-out operation and a monitoring read-out operation.

The digital video signal digitized by the A/D converter 5 is stored in a memory 8 according to an address produced by an address generator 9. In the present apparatus, a specific address control is conducted so that four video pictures are compressed and written sequentially into the memory 8, and the stored video signals are read out at a low speed defined according to a transmission line, as shown in the above-mentioned U.S. Pat. No. 4,467,355.

The digital video signal read out at the low speed is sent out to the transmission line via a D/A converter 10 and a modulator 11. Meanwhile, a monitoring video signal is read out at a television speed from the memory 8 and supplied to a monitor 13a via a D/A converter 12 and an amplifier 13.

Figure 2:
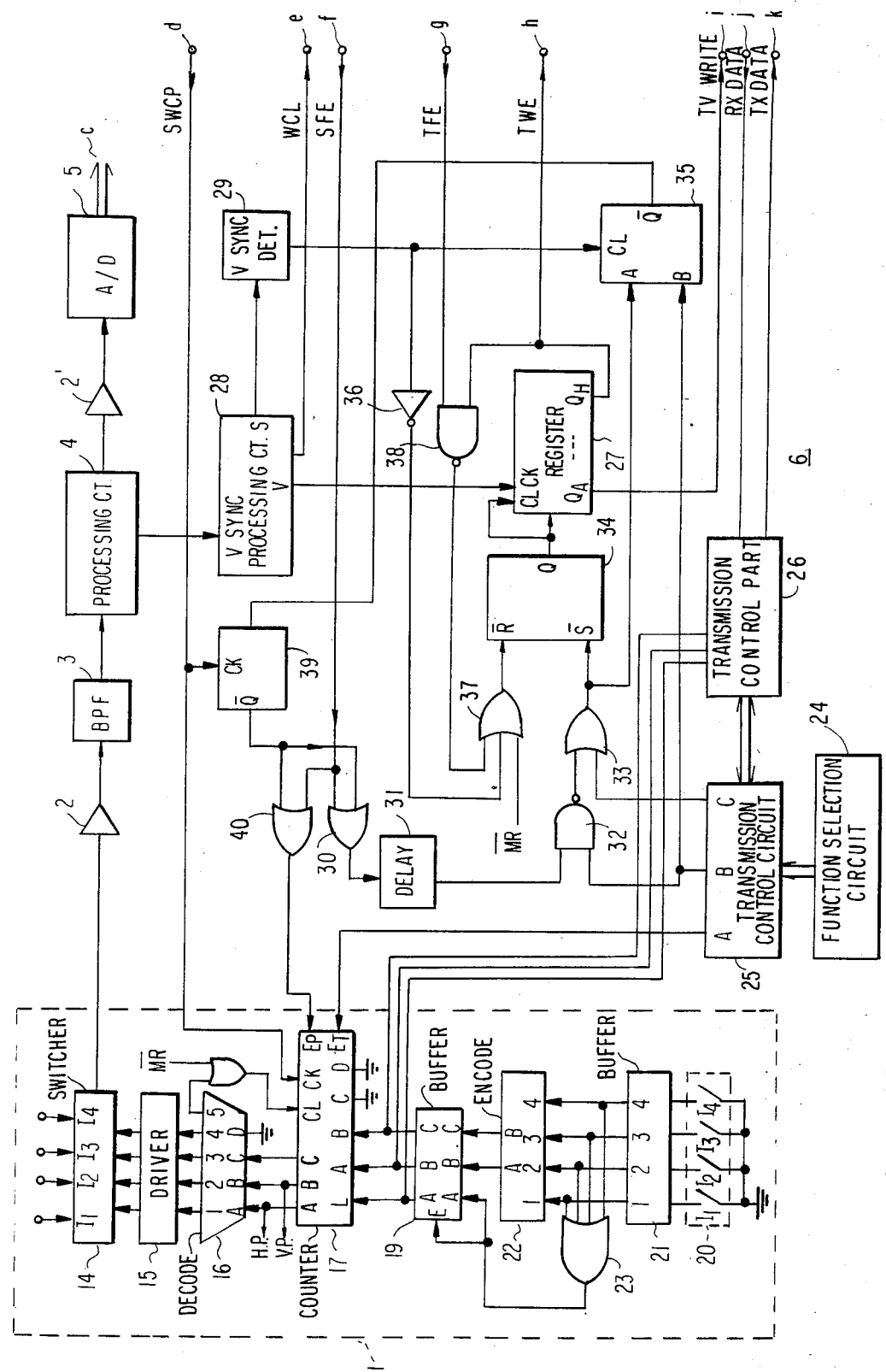
FIG. 2 is a block diagram showing details of the switcher circuit and control circuit of the embodiment shown in FIG. 1.

The present invention will be described with reference to FIG. 2. In the switching part 1, a video switcher 14 receiving the four input signals $I_1$ to $I_4$ is driven by a driving circuit 15. A decoder 16 receives a binary code from a counter 17, and converts it into a signal for selecting the four signals in order to supply to the driving circuit 15. The decoder 16 decodes an input (A,B,C) such as (0,0,0) to (1,0,1) delivered from the counter 17, while, through an OR gate 18, a decoded output corresponding to (1,0,1) clears the counter $\underline{17}$ immediately returning it to (0,0,0). Another input $\overline{MR}$ entering the OR gate 18 is an initial setting signal for clearing the counter 17 when power is supplied. A tri-state buffer 19 loads the counter 17 with data from a transmission control part 26 when this transmission side comes under remote control from the reception side.

The switching of the four video input signals can also be controlled on the transmission side. In this case, the control is specified by a selecting switch 20. An output from the selecting switch 20 is sent to an encoder 22 via a buffer circuit 21 to remove a chattering noise, and an output of the encoder circuit 22 is sent to the tri-state buffer 19. An OR gate 23 controls the tri-state buffer 19 so that the output of the encoder 22 is loaded into the counter 17 when any member of the selecting switch 20 is pressed. When the selecting switch 20 is not operated, the tri-state buffer 19 is put into a high impedance state and the state of the selecting switch 20 is not loaded into the counter 17. Outputs A and B of the counter 17 are supplied to the address generator 9 (see FIG. 1) as position signals H.P. and V.P. indicating which of four picture positions the switched input video signal corresponds to.

A function selection circuit 24 selects the transmission function such as quad-split transmission, whole picture transmission, etc., and an output therefrom is sent to a transmission control circuit 25. In a four picture transmission, i.e., the quad-split transmission, the output (A,B,C) of the control circuit 25 becomes (1,1,0). The transmission control part 26 produces a control code to be sent to the reception side, through a terminal k, and receives a control code from the reception side through a terminal j. An example of this control code is shown, for instance, in FIG. 7 of U.S. patent application Ser. No. 342,685.

In this embodiment, as previously described, the quad-split transmission operation can be performed even when all of the four input video signals are asynchronous with each other. To this end, after the video signal is switched by the video switcher 14, the clock generator 7 is operated so as to generate a clock synchronized with the input video signal in a stable manner for six field periods, and a writing operation into the memory 8 is performed in the subsequent one field period. These operations are controlled by a serial-in/parallel-out 8-bit register 27. The synchronizing signal separated in the video processing circuit 4 is supplied to a vertical synchronization processing circuit 28, wherein a vertical pulse is produced at the timing of the vertical synchronization and supplied as a clock to the register 27. The vertical synchronization processing circuit 28 produces a write-clear pulse WCL indicating the start of a television field, delivers it to a terminal e, and also outputs a vertical synchronizing signal to a vertical synchronization detection circuit 29. The register 27 produces a signal (TV WRITE) specifying a period wherein the clock generator 7 (FIG. 1) operates according to the input video signal, and outputs this signal to the clock generator 7 through a terminal i. In addition, a write-enable signal (TWE) specifying a period wherein the writing operation into the memory 8 is actually performed after the switching, is delivered from the register 7, and is sent to the address generating circuit 9 (FIG. 1) through a terminal h. After the writing operation into the memory 8, the digital video signal is read out at the low speed and transmitted to the transmission line. A slow field end signal (SFE) indicating the completion of the transmission is then sent from the address generating circuit 9 (FIG. 1) through a terminal f to make the counter 17 advance, through an OR gate 40, so as to switch to the next video signal. This signal SFE sets a set-reset (SR) flip-flop 34 through an OR gate 30, a delay circuit 31, a NAND gate 32 and an OR gate 33 to begin sequential operations for the next video signal.

When the quad-split transmission is conducted by the selection circuit 24, the outputs on terminals A and B of the transmission control circuit 25 become "1". This enables the counter 17, removes inhibition on the NAND gate 32, and enables a multivibrator circuit 35 by means of a trigger signal to its terminal A. When the video signal $I_1$ has been selected by the video switcher 14 and video information is contained in it, the synchronizing signal detection circuit 29 delivers an output "0" which clears the multivibrator circuit 35 and inhibits it even when the terminal A of the circuit 35 receives a trigger input. At the same time, an input "1" of an OR gate 37 through an inverter 36 cancels the resetting of the SR flip-flop 34. When continuous transmission has been selected by the function selection circuit 24, the SR flip-flop 34 is set through the OR gate 33. By a TV field end pulse indicating the completion of the writing operation into the memory 8 from the address generator 9 (FIG. 1) through a terminal g, the SR flip-flop 34 is reset through a NAND gate 38 so as to clear the shift register 27. When the transmission of the first still picture is completed, the slow field end signal (SFE) is input to the count enable (EP) terminal of the counter 17 to make it advance, and then the input video signal $I_2$ is selected. Further, the SFE signal, which is sent through the OR gate 30 and delayed by about 60 ms through a delay circuit 31, sets the SR flip-flop 34 in the same way as the input video signal $I_1$. This enables the operation of the shift register 27 to perform the writing operation into the memory 8 and the transmission of the still picture.

If all of the four input video signals $I_1$ to $I_4$ contain the video information, continuous transmission of still pictures is carried out in the sequence described above. However, if the selected video signal does not contain video information to be transmitted, the output of the synchronizing signal detection circuit 29 assumes the "1" state, so that the cleared status of the multivibrator 35 is removed and this circuit 35 triggered in response to a trigger input signal applied to its terminal A. The SR flip-flop 34 is maintained in its reset state since a terminal $\overline{R}$ thereof becomes "0", and is not set by an input to a terminal $\overline{S}$ thereof. At this time, the slow field end (SFE) signal is delayed by about 60 ms by the delay circuit 31 and supplied through the OR gate 33 to the flip-flop 34. Although the SR flip-flop 34 is not set by the SFE signal, the multi-vibrator 35 vibrates with a period of approximately 100 ms, and the timing of the rear edge thereof is converted into a pulse having one-clock period in a pulse-forming circuit 39 in response to the slow clock supplied from a terminal d. This pulse is supplied as a dummy slow field end signal through the OR gate 40 to the counter 17 to enable the counter 17 to advance to select the next video signal.

When the video signal thus selected contains video information, the synchronizing signal thereof is detected by the synchronizing signal detection circuit 29, and the output of this circuit turns "0". The multivibrator 35 is inhibited from vibrating, and the continuous resetting of the SR flip-flop 34 is canceled. Thus, the dummy slow field end pulse delivered from the pulse-forming circuit 39 and delayed by 60 ms in the delay circuit 31 sets the SR flip-flop 34. Therefore, the shift register 27 operates to write the digital video signal into the memory 8, and the still picture transmission is carried out. According to the present invention, when a selected input video signal has no video information, it is automatically skipped, as described above, and the subsequent video signal is selected after a period of 160 ms, which is the sum of 60 ms, the delay time of the delay circuit 31, and 100 ms, the pulse width of the output delivered from multivibrator circuit 35, so that the still picture transmission is continued without an idle time period.

Figure 3:
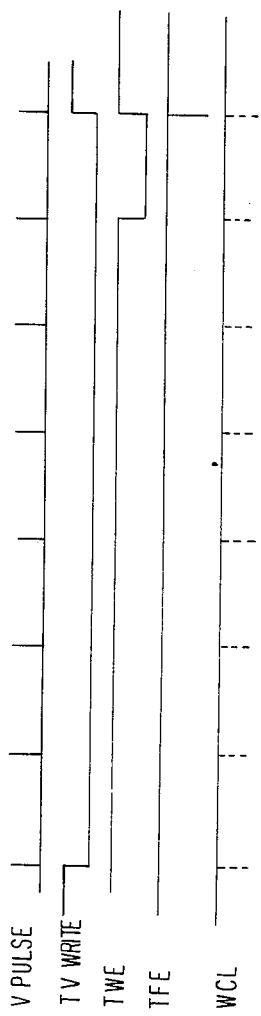
FIGS. 3 and 4 are timing charts explaining the operations of the embodiment shown in FIG. 1.

Referring to FIG. 3, this figure shows the relationship between the vertical pulse V delivered from the vertical synchronization processing circuit 28 of FIG. 1, the TV write signal (TV WRITE) and the TV write enable signal (TWE) delivered from the register 27, the signal (TFE) indicating the completion of the writing operation into the memory 8, and the signal (WCL) indicating the start of the television field delivered from the processing circuit 28 and the clearing a write address. In the WCL signal shown in FIG. 3, a field pulse is delivered from the processing circuit 28 every television field, while the signal clearing the write address is selected in accordance with the TV write enable signal, shown by the solid line in the chart, for delivery.

Figure 4:
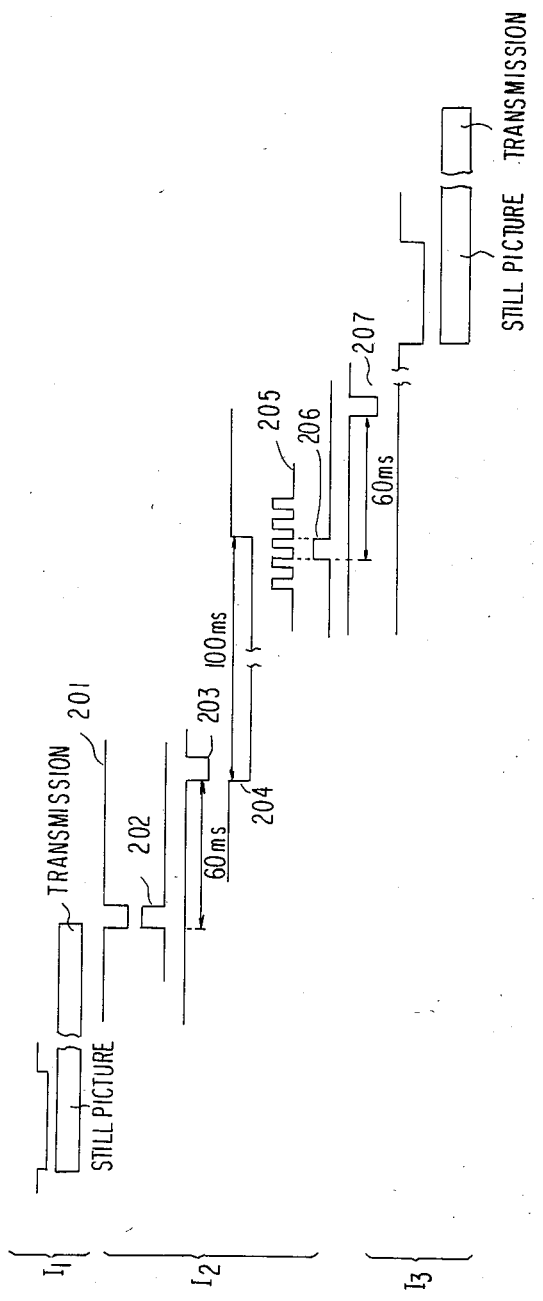

Referring to FIG. 4, the automatic skip operation according to the present invention is explained hereinafter. This chart shows the timings of the automatic skip when the video signal $I_1$ contains video information, the video signal $I_2$ contains no video information input, and the video signal $I_3$ contains video information. When the SFE signal 201 is received from the terminal e at the completion of the still picture transmission with respect to the video signal $I_1$, the count enable signal 202 is input to the EP terminal of the counter 17 so that the video signal $I_2$ is selected. Since a synchronizing signal is not detected in the video signal $I_2$, the multivibrator 35 is made to vibrate by a trigger signal 203 delayed by 60 ms, the rear edge of a pulse 204 having a pulse width of 100 ms is converted into a pulse for advancing the counter 17 in response to the SWCP signal. Therefore, the video signal $I_3$ is selected and the SR flip-flop 34 is set by a pulse 207 delayed by 60 ms to write the digital video signal corresponding to the video signal $I_3$ into the memory 8 and thus the still picture transmission is carried out.

According to the present invention, any input video signal having no video information can be skipped when a plurality of input video signals are received and transmitted sequentially, as described above. The present invention also has the effect of eliminating the discontinuation of still picture transmission due to the absence the cut-off of video information.

What is claimed is:

1. A still picture transmission apparatus for transmitting still pictures over a transmission line comprising:
    means responsive to a plurality of video signals for sequentially selecting one of them;
    memory means for compressing the video signals delivered from said selecting means and for storing the compressed video signals at predetermined areas, each of said areas corresponding to one of said plurality of video signals;
    means for reading the compressed video signals from said memory means at a speed corresponding to the frequency bandwidth of the transmission line;
    means for transmitting the compressed video signals read by said reading means to said transmission line; and
    means for advancing the selection operation of said selecting means when a selected video signal delivered from said selecting means does not contain video information.

2. The still picture transmission apparatus as claimed in claim 1, wherein said selecting means includes counter means for stepping its count value in response to a signal indicating that the reading means has completed its reading operation, and said advancing means includes means for detecting the absence of a television synchronizing signal in said selected video signal, said counter means being stepped in response to the output of said detecting means.

3. The still picture transmission apparatus as claimed in claim 1, wherein said advancing means includes means for detecting the absence of a television synchronizing signal in said selected video signal.

4. The still picture transmission apparatus as claimed in claim 3 further comprising:
    register means for directing the operations of said memory means and said reading means; and wherein
    said means for advancing includes;
    means for receiving a television synchronizing signal from said selected video signal;
    multivibrator means responsive to said synchronizing signal receiving means for producing a signal indicative of whether or not a synchronizing signal was detected in said selected video signal;
    dummy signal generating means, responsive to said multivibrator means, for generating an artificial end of transmission signal representing completion of transmission of the selected video signal when no synchronizing signal has been detected;
    delay means, responsive to said artificial end of transmission signal, for producing a delayed aritificial end of transmission signal; and
    means, responsive to said delayed artificial end of transmission signal, for enabling said register means to direct the memory means and reading means to perform their operations a predetermined time, corresponding to the delay time of the delay means, after generation of said artificial end of transmission signal.

5. The still picture transmission apparatus as claimed in claim 4 wherein; said selecting means includes counter means for sequentially designating, one at a time, each of said plurality of video signals, and wherein said means for advancing further includes means for applying said artificial end of transmission signal to said counter means to cause said counter means to designate the next video signal in response to said artificial end of transmission signal.

6. A still picture transmission apparatus for transmitting still pictures over a transmission line comprising:
    switcher means for sequentially selecting a plurality of video signals, one at a time;
    signal storage and compression means for compressing and storing each of the video signals selected by the switcher means;
    means for transmitting the compressed and stored video signals over said transmission line;
    means for detecting a synchronizing signal in each of said plurality of video signals;
    signal generating means, responsive to said synchronizing signal detecting means for producing an output signal representing the absence of video information in the then selected video signal when a synchronizing signal is not detected; and
    means responsive to said output signal for causing said switcher means to switch to thereby select the next video signal and send it to said signal storage and compression means for compression and storage.

7. The still picture transmission apparatus as claimed in claim 6 further including; control means for directing the operation of said signal storage and compression means, and delay means, responsive to said output signal for producing a delayed output signal, said control means being responsive to said delayed output signal to cause said signal storage and compression means to compress and store the next video signal after it has been selected by the switcher means in response to the output signal.

8. The still picture transmission apparatus as claimed in claim 7; wherein said synchronizing signal is a television vertical synchronizing signal, and said means for detecting includes a vertical synchronizing signal detecting means for producing a signal corresponding to the vertical synchronizing signal when detected.

9. The still picture transmission apparatus as claimed in claim 8; wherein said signal generating means includes a multivibrator which generates a periodic series of pulses when no vertical synchronizing pulse is detected in the selected video signal; clock means for generating clock pulses at a selected rate, and means, responsive to a coincidence of a clock pulse and one of said multivibrator produced pulses for producing said output signal.

* * * * *